United States Patent [19]

Manin

[11] 4,346,779
[45] Aug. 31, 1982

[54] VAPOR IMPLOSION IN A CLOSED FLEXIBLE ENCLOSURE

[75] Inventor: Michel G. Manin, Massy, France

[73] Assignee: Compagnie Generale de Geophysique, Massy, France

[21] Appl. No.: 150,580

[22] Filed: May 16, 1980

[30] Foreign Application Priority Data

May 17, 1979 [FR] France ............... 79 12589

[51] Int. Cl.³ ............... G01V 1/135; G01V 1/38
[52] U.S. Cl. ............... 181/120; 367/146
[58] Field of Search ............... 181/115, 118–120; 367/144, 145, 146

[56] References Cited

U.S. PATENT DOCUMENTS

| | | | |
|---|---|---|---|
| 3,509,961 | 5/1970 | Fitch | 181/115 |
| 3,712,408 | 1/1973 | Muniz | 181/120 |
| 3,721,311 | 3/1973 | Mott-Smith | 181/120 |
| 3,944,019 | 3/1976 | Pauletich | 181/120 |
| 4,153,134 | 5/1979 | Yang | 181/120 |

FOREIGN PATENT DOCUMENTS

| | | |
|---|---|---|
| 2055856 | 5/1971 | France . |
| 2102447 | 4/1972 | France . |
| 2106820 | 5/1972 | France ............ 181/120 |
| 2300346 | 9/1976 | France . |
| 2392400 | 12/1978 | France . |

*Primary Examiner*—Howard A. Birmiel
*Attorney, Agent, or Firm*—Schwartz, Jeffery, Schwaab, Mack, Blumenthal & Koch

[57] ABSTRACT

The invention relates to seismic sources in which a shock wave is produced in a liquid mass by the implosion of a volume of vapor, particularly water vapor. According to the invention, the vapor to be imploded is formed inside a closed, flexible enclosure, surrounding an injection head, fitted with a vapor opening 103 capable of releasing vapor at 5 bars and 170° C., controlled by an electromagnetic valve. Liquid nuclei are advantageously introduced into this vapor by means of a pipe for cold water which is under pressure and under the control of an electromagnetic valve, this water arriving in the cavity in order to exit through spray openings. These nuclei produce a vigorous drop in pressure inside the vapor, and hence an implosion and a shock wave, after which a pipe allows the condensate to be recovered. The invention is of use notably as a seismic marine source.

12 Claims, 6 Drawing Figures

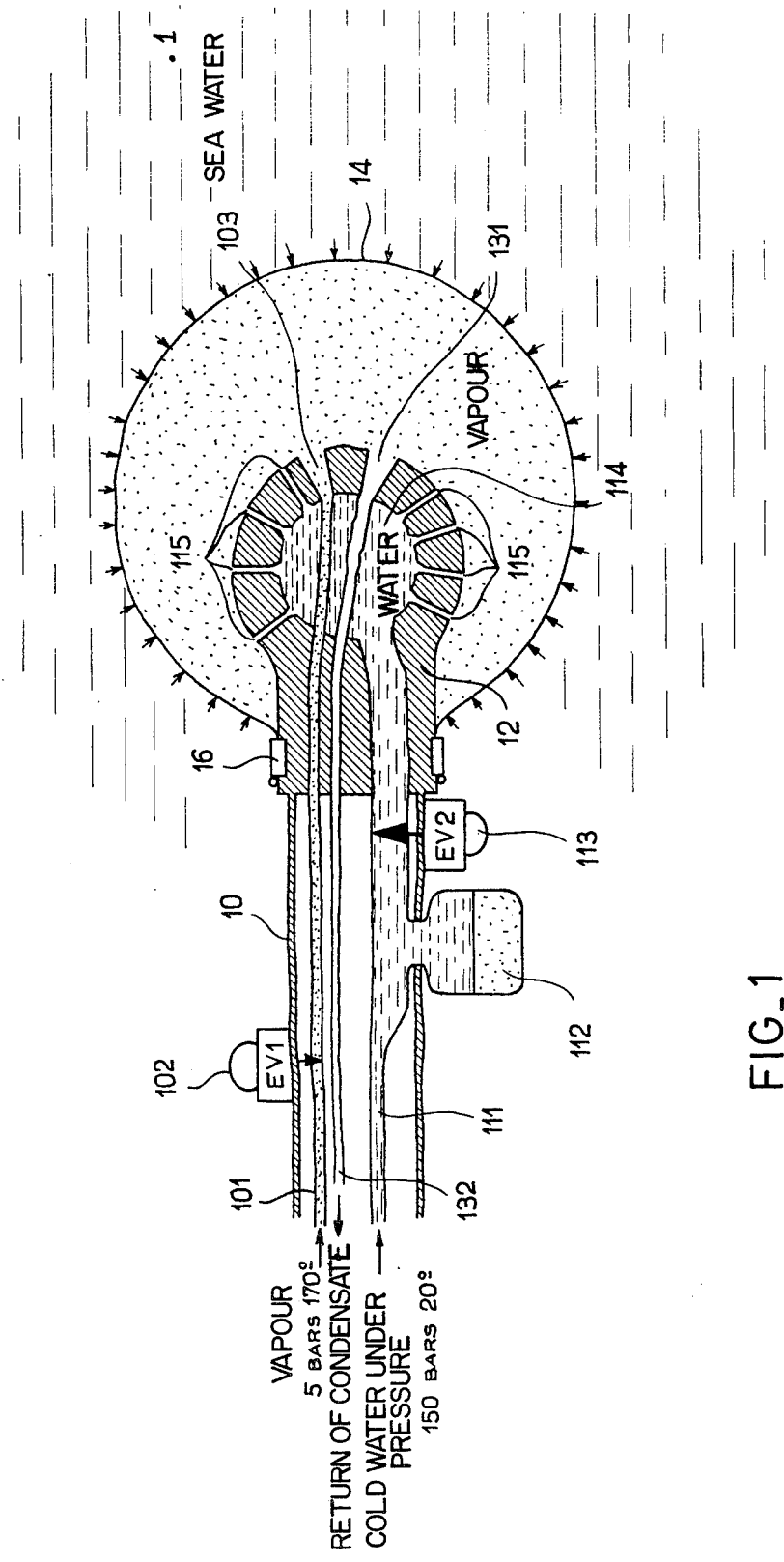
FIG_1

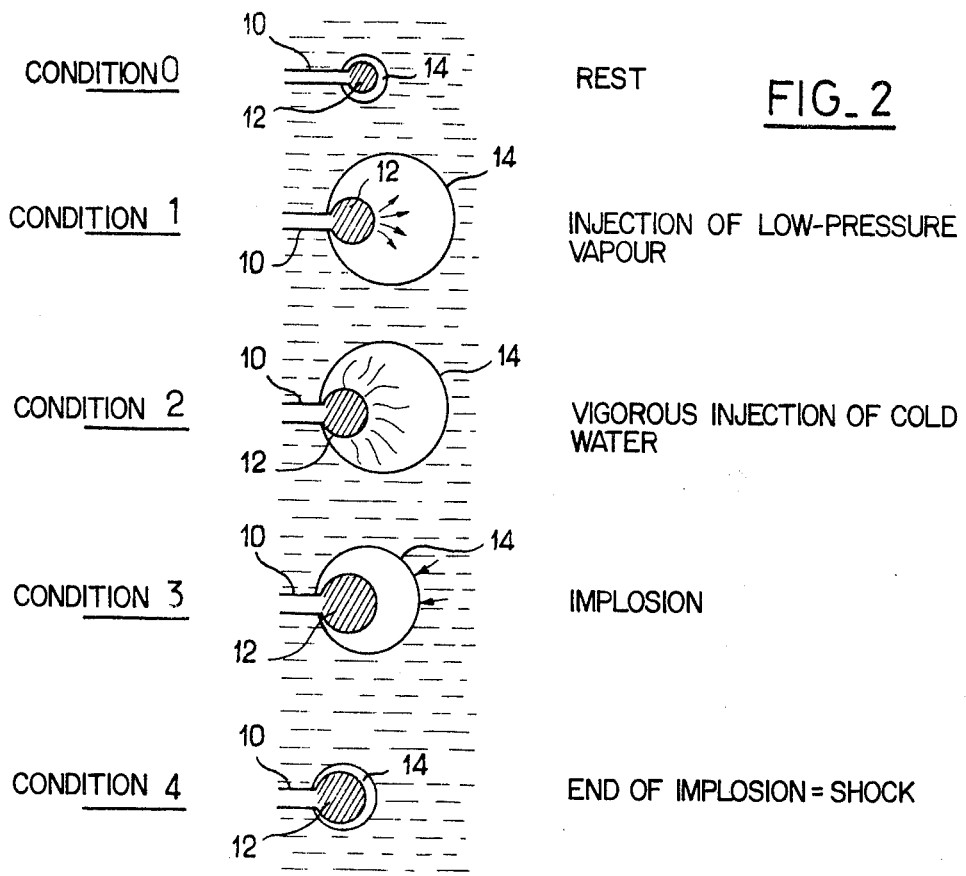
FIG_2
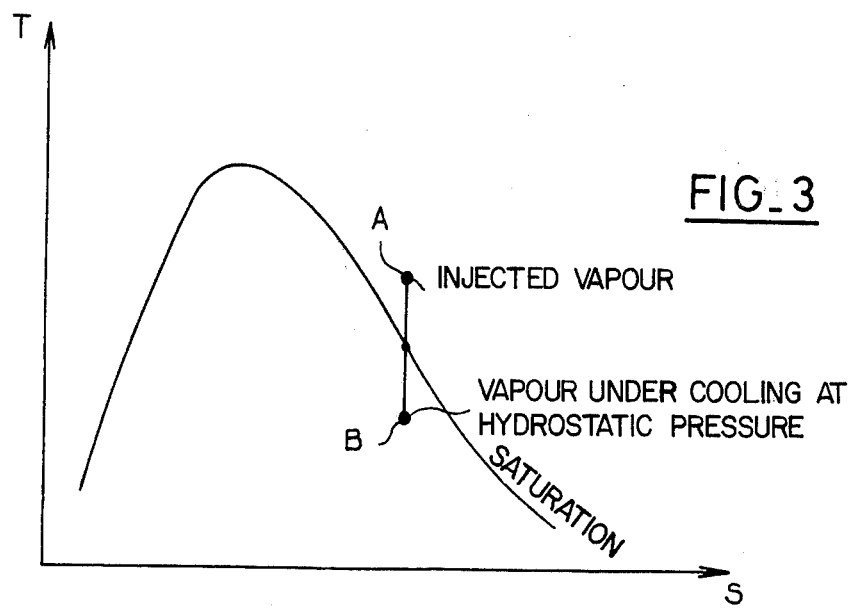
FIG_3

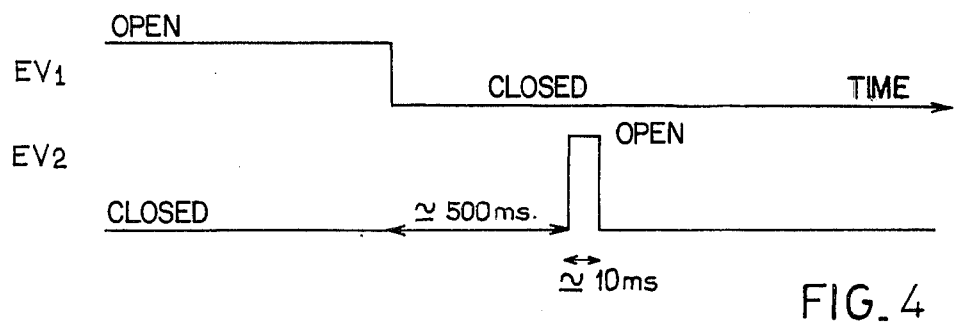
FIG_4
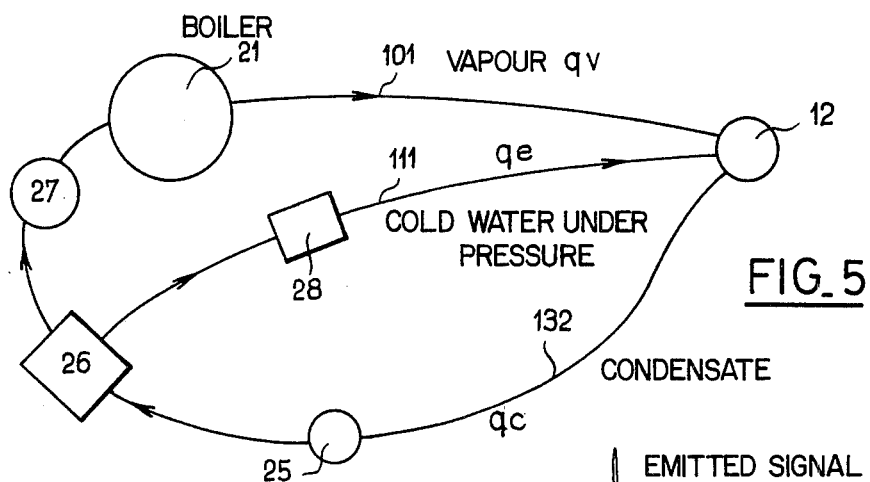
FIG_5
FIG_6

VAPOR IMPLOSION IN A CLOSED FLEXIBLE ENCLOSURE

BACKGROUND OF THE INVENTION

1. Field of the Invention

This invention relates to artificial seismic sources used in geophysical marine prospecting.

2. Description of the Prior Art

In French Pat. No. 6,926,481 and its additions (Nos. 7,028,731 and 7,715,959), a method and an apparatus was described for producing a shock wave inside a mass of water in view of geophysical studies of the seismic prospecting type. According to this technique, water vapour is produced at a predetermined temperature and pressure, and a certain volume of water vapour is rapidly released at the required depth into the mass of water, which volume of water vapour expands into a single large bubble which then condenses vigorously, thus producing an implosion which generates a high-energy shock wave.

This seismic marine source, which has been used for several years, has considerable advantages: the production of a reproducible of acoustic wave ("signature"), which is advantageous for seismic studies; and absence of pollution. However, it requires vapour which is under a fairly high pressure (usually from 50 to 100 bars); also, the expansion of the bubble is accompanied by an additional acoustic signal which precedes the implosion itself. Although it is known that, by means of complex mathematical processes, it is possible to compensate for the fact that the signature of the seismic source is not a pure peak, the additional acoustic signal which precedes the peak proves to be inconvenient in certain cases.

SUMMARY OF THE INVENTION

An object of the present invention is principally to provide a seismic marine source of this type, the signature of which approaches a pure peak (Dirac's impulse).

Another object of the invention is to improve the technical and economic conditions of the operation of the mentioned seismic source, particularly by using vapour under low pressure and at a low temperature, which preferably operates in a closed circuit.

First of all, the invention provides a method for producing a shock wave in a liquid mass by the implosion of a volume of vapour.

According to the proposed method, the formation of the volume to be imploded is initiated inside a closed, flexible enclosure.

In particular, a predetermined quantity of vapour which is under a pressure above the hydrostatic pressure is released inside the closed, flexible enclosure, in the implosion zone, in order to inflate the closed enclosure.

The vapour is advantageously released with slight superheating at a pressure which is slightly above the hydrostatic pressure in the implosion zone.

According to the presently preferred embodiment of the invention, at the end of a predetermined delay after the vapour has been released, a cold liquid of the same nature as the vapour is sprayed into the closed enclosure which allows the start of the condensation, and thus the start of the implosion, to be controlled.

In a particular embodiment, water vapour is released at approximately 5 bars and 170° C., and the liquid is injected at approximately 150 bars and at a temperature approaching the ambient temperature.

The invention also provides an apparatus for carrying out the method described above, of the type comprising a vapour source connected to an injection head by means of an electromagnetic valve. In the proposed apparatus, a flexible membrane which is mounted sealingly around the injection head communicates through its interior with the vapour outlet of the injection head. The vapour source preferably produces vapour under low pressure with slight superheating.

According to another characteristic of the invention, the apparatus also comprises a pump for cold liquid under pressure, the cold liquid being of the same nature as the vapour, communicating by means of an electromagnetic valve, in parallel on a pressure absorber, with spray openings for the liquid which are in the injection head in order to communicate with the interior of the membrane.

Also, the apparatus very advantageously comprises a return pipe communicating with the interior of the membrane and capable of cooperating with suction means for the recovery of the condensate.

In a preferred embodiment, the membrane is made of an elastomeric material, such as synthetic rubber.

Other characteristics and advantages of the invention will be revealed from reading the detailed description which follows, with reference to the accompanying drawings, which are only provided to illustrate a preferred embodiment of the invention in a non-limiting manner:

DESCRIPTION OF THE DRAWINGS

FIG. 1 is a schematic sectional view illustrating a vapour injection head for the operation of the method according to the present invention;

FIG. 2 is a diagram showing the successive states of the volume of vapour inside the closed, flexible enclosure which is produced around the injection head of FIG. 1;

FIG. 3 an entropy diagram illustrating the change in condition of the injected vapour, immediately after being injected;

FIG. 4 is a time diagram illustrating the condition of the two electromagnetic valves incorporated in the device of FIG. 1, and also illustrates the vapour pressure inside the envelope produced by the flexible membrane;

FIG. 5 is a schematic view illustrating, in a diagram, the stages in which the vapour and the liquid are used in the apparatus according to the invention; and FIG. 6 is a time diagram illustrating the "signature", i.e. the signal emitted by a seismic marine source according to the present invention.

DETAILED DESCRIPTION OF THE INVENTION

In FIG. 1, the reference 1 generally designates sea water, into which a pipe designated by the general reference 10 is immersed, and the pipe is terminated at its end by an injection head designated by the general reference 12.

On the injection head, a closed, flexible enclosure is attached which is constituted by an envelope made of elastomeric material 14, which is attached slightly upstream of the operating part of the injection head 12, by means of a seating ring 16. In the injection head, there are a vapour release outlet, designated by 103, a plurality of water spraying openings designated by 115, and a return opening for recovering the condensate, designated by 131.

Inside the pipe 10, a system of pipes 101 is able to convey the vapour which is, for example, under a pressure of 5 bars and a temperature of 170° C., up to an electromagnetic valve 102 (EV1), which controls the release of the vapour through the outlet 103 of the injection head, this outlet communicating with the interior of the membrane 14.

On the other side, another pipe 111 is adapted to convey cold water under pressure, for example 150 bars, and at the ambient temperature, e.g. 20° C. This pipe 111 communicates with the right-hand side of a pressure absorber 112 which contains a volume of gas, in order to avoid a building up of water shock-waves in the pipe system 111 at the time of the implosion. An electromagnetic valve 113, or EV2, is provided downstream of this pressure accumulator 112, which controls the arrival of the water under pressure into an internal cavity 114 in the injection head. This cavity 114 communicates with all the water spraying openings 115. It can be immediately seen that the water under pressure arriving in the cavity 114 is going to be sprayed through each of the openings, and can thus be released inside the membrane 14.

Finally, the recovery opening 131 communicates with a return pipe 112 which ascends inside the principal pipe 10.

It will also be noted that this principal pipe 10 is relatively long since it has to ensure the connection between the immersed injection head 12 and the systems for vapour preparation, for compressing the cold water, as well as for recovering the condensate, which are generally installed on board a ship. Thus, the length of the pipe 10 is usually of the order of 50 m. Suitable precautions are naturally provided inside the pipe 10, particularly for the purpose of heat insulation.

FIG. 2 illustrates very schematically the different stages of the operation of the method according to the invention. The only components which are shown are the pipe 10, the injection head 12 and the membrane 14.

The first line in FIG. 2 illustrates the initial stage, or rest stage 0, in which the membrane 14 floats near the injection head, in the deflated condition.

In Stage 1, low-pressure vapour is injected through the pipe 101, the electromagnetic valve 102 being open during the time interval shown on the first line of FIG. 4. This vapour progressively inflates the membrane 14. In other words, the first phase of the method consists of slowly injecting low-pressure vapour which is under slight superheating, by means of the electromagnetic valve EV1, into the volume contained between the injection head itself and the membrane 14. The vapour pressure is selected to be slightly above the hydrostatic pressure in the sea water at the firing depth, and the membrane 14 inflates to attain a maximum volume. During the first phase, an acoustic signal is not yet produced in the sea water owing to the slow speed of injecting the vapour inside the membrane, in contrast to the previously suggested methods.

As is indicated by the second line of FIG. 4, after having cut off the vapour by means of the electromagnetic valve 1, designated by 102 in FIG. 1, there is a certain waiting time, of the order of a few hundred milliseconds, for the vapour to become supercooled but without condensing. The entropy diagram of FIG. 3 illustrates this transition of the vapour. Point A is above the saturation curve and corresponds to the injected vapour. While expanding, this passes to the hydrostatic pressure from ambience and becomes supercooled at point B.

When the number of condensation nuclei inside the membrane 14 becomes sufficient, a vigorous condensation jump is produced in the supercooled vapour mass, a jump which is translated into a vigorous drop in pressure, since this passes from hydrostatic pressure (i.e. of the order of 1.6 bars) to saturation pressure at the temperature of the cold sea water which is generally 20°C, this saturation pressure being 0.03 bar. The end of this phase is thus a sphere at a pressure of 0.03 bar in the marine medium at 1.60 bar.

An implosive movement then follows which is terminated by a violent shock on the metallic sphere 12 rendered by the membrane 14 driven by the ambient sea water 1.

Although this phenomenon may be produced by itself, we prefer at present to produce it in a controlled manner by injecting during the second stage, illustrated in FIG. 2, cold water under pressure, which is sprayed inside the membrane from the openings 115. The second line of FIG. 4 illustrates this condition, the electromagnetic valve EV2 being open for a very short time (of the order of 10 milliseconds), with a predetermined delay after the closure of the electromagnetic valve EV1, this delay being of the order of 500 milliseconds.

It has been observed that this supply of liquid nuclei itself initiates the vigorous condensation jump in the supercooled vapour mass, which produces a temporal control of the moment of implosion.

The start of the implosion is shown in Stage 3 of FIG. 2, the membrane thus collapsing towards the injection head 12. At the end of the implosion, the membrane 14 makes an impact on the injection head 12, hence the shock wave which can be used for seismic prospecting.

The pressure inside the membrane remains at hydrostatic pressure until the electromagnetic valve EV2 is opened and then it falls vigorously to the value of saturation pressure in the cold water which is, as pointed out previously, 0.03 bar.

The condensate remaining inside the membrane 14 at the end of these operations is recovered very advantageously in the pipe system 132 by means of a suction pump which is not shown in FIG. 1.

FIG. 5 illustrates the apparatus for the operation according to the invention in schematic manner.

A reservoir 26 of water or any other suitable liquid is connected on one side to a pump 27 which powers a low-pressure boiler 21 which is capable of producing the vapour at low pressure and with slight superheating. This vapour thus arrives at the pipe system 101 in order to reach the injection head 12 as is shown in FIG. 1. The quantity of vapour delivered under the control of the electromagnetic valve EV1 is $q_v$.

On another side, the water reservoir 26 is connected to a high-pressure pump 28, operating at approximately 150 bars, which sends the fluid towards the pipe 111 so that a quantity $q_e$ of liquid under pressure arrives at the injection head 12 in a manner controlled by the electromagnetic valve EV2.

Conversely, after the implosion, a quantity $q_c$ of condensate returns from the injection head 12 through the pipe 132 towards suction means such as an ejector or a suction pump 25, to return to the reservoir 26.

FIG. 6 illustrates the waveform or signature produced by the seismic source according to the invention;

it will be noted that there is no preliminary expansion peak above the principle peak. This signature thus greatly approximates Dirac's impulse, which provides numerous advantages for processing seismic recordings taken using geophones from the shock wave produced by the seismic source according to the invention.

Another advantage of the invention is that the proposed seismic source operates in a closed circuit without consuming engine fluid. When working in the sea, this characteristic is important since the boat has to desalinate using sea-water distilling apparatus in order to obtain fresh water which is necessary for working in an open circuit.

Yet another advantage is the use of vapour under low pressure and at a low temperature which considerably simplifies the technological problems posed for the choice of the pipes and the electromagnetic valves which are used.

It will also be noted that the mechanical output of the proposed seismic source is good, since in order to produce a bubble of 1 m³ of vapour at a depth of 6 m under sea water, 1000 liters of vapour at 1.6 bar and 112° C. are required (the vapour being considered here at the end of the inflation of the envelope); these 1,000 liters of vapour represent 862 g of water under these conditions. Moreover, in order to heat 862 g of water at 1.6 bar and 112° C., 2,550 kilojoules are used. Compared with the previous apparatus referred to above, this figure has proved to be very advantageous.

The use of a membrane according to the present invention allows work to be carried out using the low-pressure vapour, and hence economic savings for the acquisition of this vapour. Simultaneously, it also allows the vapour volume which has been thus produced to be insulated from the external liquid nuclei, while finally producing a certain thermal insulation between this vapour volume and the ambient mass of water. As a result of this, conditions are produced which are much improved for the production of the implosion.

The working fluid preferably has a vaporisation temperature which is relatively low compared with the ambient temperature. In this respect, the vaporisation temperature of water is very suitable. As a variation, a fluid having a low, latent heat of vaporisation may be used which improves the thermal output.

Naturally, different types of membranes may be used for the operation of the invention, for example an envelope made of synthetic rubber may be chosen.

What is claimed is:

1. A method for producing a shock wave in a liquid mass by an implosion of a volume of vapour in a closed, flexible enclosure positioned within said liquid mass, said method comprising the steps of introducing into said flexible enclosure vapour at an elevated temperature relative to ambient and at a pressure above hydrostatic pressure, said enclosure as a result being progressively inflated; ceasing the introduction of vapour and allowing said vapour to be supercooled without condensing, and thereafter condensing said vapour to cause a sudden drop in pressure to the saturation pressure of the vapour at ambient temperature of the liquid mass, said condensation resulting in an implosion which can be used for seismic prospecting purposes.

2. The method of claim 1 further including the step of providing a predetermined delay after the vapour has been stopped, and thereafter introducing into the enclosure in the form a spray a cold liquid of the same nature as the vapour, said liquid allowing the start of the condensation of the vapour and the resulting implosion to be controlled.

3. The method according to claim 2, wherein water vapour is cessation at approximately 5 bars and 170° C., and the liquid is injected at approximately 150 bars and at a temperature approaching ambient.

4. The method of claim 2 wherein said predetermined delay between the release of vapor introduction and the introduction of the cold liquid spray is approximately 500 milliseconds, and the duration of the cold liquid spray is approximately 10 milliseconds.

5. The method of claim 1 further including the step of recovering the condensate from the enclosure following implosion.

6. The method of claim 1 wherein said vapor is water vapor.

7. An apparatus according to claim 1, further comprising a pump for a cold liquid which is under pressure and of the same nature as the vapour, communication means connecting said pump with spray openings in the injection head through which liquid passes into the interior of the membrane, and a pressure absorber connected to said communication means in order to avoid a buldup of water shock waves at the time of implosion.

8. An apparatus for the operation of the method according to claim 1, comprising a vapour source connected to an injection head via an electromagnetic valve, and a flexible membrane mounted sealingly around the injection head and communicating through its interior with a vapour outlet in the injection head.

9. An apparatus according to claim 1, wherein the vapour source is adapted to produce vapour at low-pressure and under slight superheating.

10. An apparatus according to claim 1, also comprising a return pipe communicating with the interior of the membrane and capable of cooperating with suction means to recover the condensate.

11. An apparatus according to claim 1, wherein the membrane comprises an elastomeric material.

12. Apparatus for producing a shock wave in a liquid mass by an implosion, comprising:
   (a) a vapor source, including means for heating said vapor, and subjecting said vapor to a pressure at least slightly above the hydrostatic pressure at the site;
   (b) an injection head communicating with said vapor source,
   (c) a flexible membrane mounted sealingly around said injection head,
   (d) means formed in said injecting head for releasing vapor directed thereto into said flexible membrane for inflating the same,
   (e) means for effecting condensation of said vapor thereby creating an implosion, as a result of which said membrane strikes with force said injection head to create a shock wave, and
   (f) means for removing condensate from the collapsed membrane.

* * * * *